A. GREGORY.
LID FOR COOKING UTENSILS.
APPLICATION FILED OCT. 21, 1911.
1,028,712.
Patented June 4, 1912.
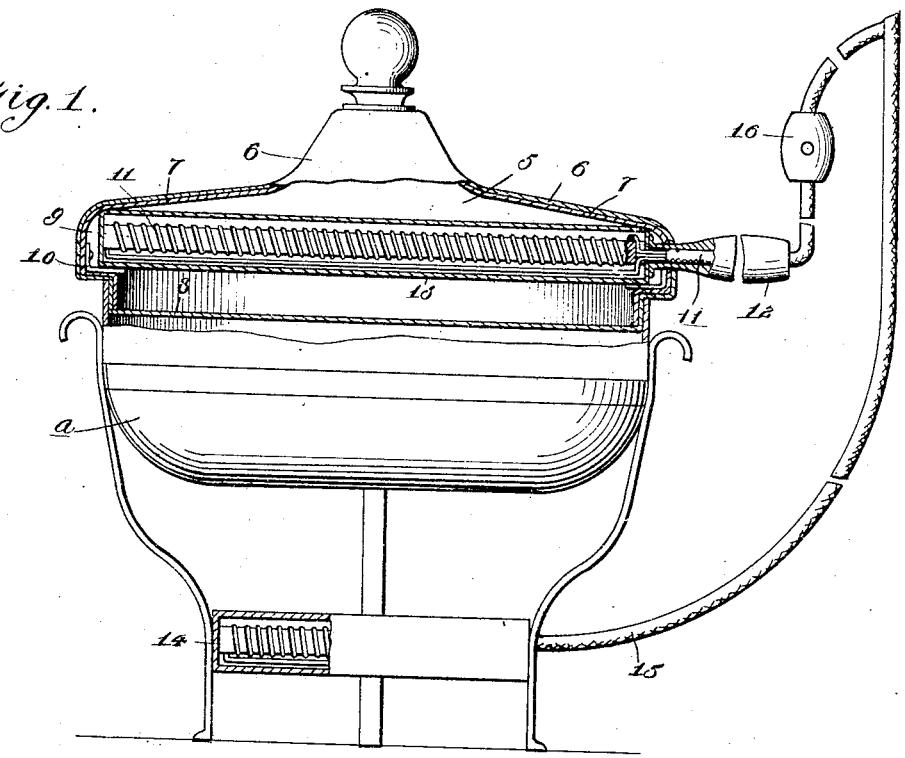
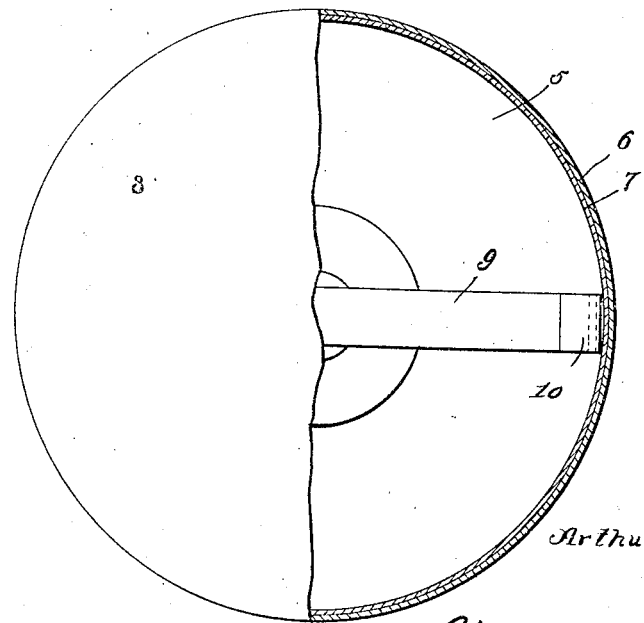
Inventor
Arthur Gregory.
Witnesses
By Victor J. Evans
Attorney

UNITED STATES PATENT OFFICE.

ARTHUR GREGORY, OF DURANGO, MEXICO.

LID FOR COOKING UTENSILS.

1,028,712.　Specification of Letters Patent.　Patented June 4, 1912.

Application filed October 21, 1911. Serial No. 655,944.

*To all whom it may concern:*

Be it known that I, ARTHUR GREGORY, a citizen of the United States, residing at Durango, Mexico, have invented new and useful Improvements in Lids for Cooking Utensils, of which the following is a specification.

The general object of the invention is to provide means for directing heat down and onto the upper surface of substance contained in cooking utensils such as chafing-dishes, and to this end the invention consists in a cover provided with an electric heater and adapted, when arranged on the receptacle, to direct the heat downwardly and onto the contents of the receptacle so that the crusting or browning so generally desired, may be effected without leaving the bottom of the utensil exposed to the heat for a period longer than required to cook the contents of the receptacle.

Other objects will appear and be better understood from the following description taken in connection with the accompanying drawings, in which, Figure 1 is a view partly in section and elevation of a chafing-dish provided with my improved device. Fig. 2 is a detail bottom plan of the cover partly in section.

5 indicates a compartment in the cover 6, and 7 indicates a lining of asbestos or other poor heat conducting material which covers all the interior of the compartment excepting the floor or bottom 8 thereof. The bottom 8 is preferably formed of thin sheet metal of good heat conducting material.

9 indicates an electric heater arranged in the compartment 5 and suitably supported therein by brackets 10. 11 indicates the feed wire which is herein shown as extending through the hollow handle 12, the said handle, by preference, being extended through the wall of the cover and secured to the frame 13 of the heater so that when handling the cover detachment of the handle therefrom will be more efficiently prevented than if the handle were secured to the body of the cover.

When the utensil *a* is fitted with an electric heater such as indicated by 14, the feed wire 11 may be connected with the feed wire 15 for the heater 14 and the current for the heater 9 controlled by the switch 16. It will be observed, however, that the efficiency of the cover does not depend upon the heating apparatus for the utensil and moreover, the heating cover may be of various shapes and sizes so as to be used with the various forms of cooking utensils now in use.

Although I have shown and described one embodiment it is to be understood that I am not to be limited to the specific arrangement and construction of parts since various changes may be made, within the scope of the appended claim without departing from the spirit or sacrificing any of the advantages of the invention.

What I claim as new is:

A chafing dish cover comprising a hollow body closed at either end and having one end portion reduced so as to enter the dish, an electric heater arranged in spaced relation to the opposite ends of the body and supported from the shoulder resulting from reducing the said end portion, and a hollow handle adapted for receiving electric leads and extending through the body and connected to one end of the heater.

In testimony whereof I affix my signature in presence of two witnesses.

ARTHUR GREGORY.

Witnesses:
 TOMÓS WATSON,
 E. W. WOODS.

Copies of this patent may be obtained for five cents each, by addressing the "Commissioner of Patents, Washington, D. C."